United States Patent [19]

Fukuyama et al.

[11] Patent Number: 5,228,719
[45] Date of Patent: Jul. 20, 1993

[54] AUTOMOTIVE ACTIVE SUSPENSION SYSTEM FOR ANTI-ROLLING CONTROL

[75] Inventors: Kensuke Fukuyama; Naoto Fukushima; Yosuke Akatsu, all of Kanagawa Pref.; Itaru Fujimura, Tokyo; Masaharu Sato, Kanagawa, all of Japan

[73] Assignee: Nissan Motor Co., Ltd., Yokohama, Japan

[21] Appl. No.: 866,047

[22] Filed: Apr. 9, 1992

[30] Foreign Application Priority Data

Apr. 10, 1991 [JP] Japan .................... 3-077655

[51] Int. Cl.$^5$ .............................................. B60G 17/01
[52] U.S. Cl. ............................ 280/707; 364/424.05
[58] Field of Search .............. 280/707, 689, DIG. 1, 280/772; 364/424.05

[56] References Cited

U.S. PATENT DOCUMENTS

| | | | |
|---|---|---|---|
| 4,650,212 | 3/1987 | Yoshimura | 280/707 |
| 4,733,878 | 3/1988 | Kanazawa et al. | 280/91 |
| 4,834,419 | 5/1989 | Kozaki et al. | 280/707 |
| 4,882,693 | 11/1989 | Yopp | 280/707 X |
| 4,967,360 | 10/1990 | Fukunaga et al. | 364/424.05 |
| 5,092,624 | 3/1992 | Fukuyama et al. | 280/707 |
| 5,113,345 | 5/1992 | Mine et al. | 280/707 X |
| 5,114,177 | 5/1992 | Fukunaga et al. | 280/707 |

FOREIGN PATENT DOCUMENTS

62-191511 12/1987 Japan .
2-3511 10/1988 Japan .

Primary Examiner—Brian Johnson
Attorney, Agent, or Firm—Lowe, Price, LeBlanc & Becker

[57] ABSTRACT

An automotive suspension control system for anti-rolling motion control is provided. This system serves to adjust wheel loads acting on driven wheels when a wheel speed difference between the driven wheels is greater than a preselected value, concluding that slippage occurs at one of the driven wheels, the adjustment is carried out for securing traction of a slipping driven wheel. The system is responsive to lateral acceleration acting on a vehicle body to decrease a degree of adjustment of the wheel loads according to increase in the lateral acceleration for enhancing cornering stability on road surfaces having different friction coefficients.

8 Claims, 8 Drawing Sheets

AUTOMOTIVE ACTIVE SUSPENSION SYSTEM FOR ANTI-ROLLING CONTROL

BACKGROUND OF THE INVENTION

1. Field of the Invention

The present invention relates generally to an active suspension control system for a vehicle for suppressing vehicular rolling motion caused by lateral acceleration acting on a vehicle body. More particularly, the invention relates to an active suspension control system for adjusting wheel loads acting on driven wheels according to a wheel speed difference between the driven wheels to secure acceleration characteristics and driving stability, for example, when a vehicle travels on a road surface having different friction coefficients between left and right wheels.

2. Description of the Background Art

Japanese Patent First Publication No. 2-3511 which corresponds to the U.S. Pat. No. 5,114,177, discloses an active suspension control system. This control system determines whether a friction coefficient of a road surface on which a vehicle travels is smaller than that of a standard road or not. If the result indicates that the vehicle travels on a lower friction road surface, active suspension control is effected so that anti-rolling moment for rear wheels is provided smaller than that for front wheels, for shifting a load acting on the rear wheels to less than that acting on the front wheels, allowing a rear portion of a vehicle body to roll slightly to secure the cornering abilities of the rear wheels for improving driving stability on the lower friction road surface. Determining the friction coefficient of the road surface is accomplished by utilizing either of a lateral acceleration acting on the vehicle body or a wheel speed difference between driven and compliance wheels. A ratio of the rear anti-rolling moment to the front anti-rolling moment is varied based on a value of the lateral acceleration or the wheel speed difference. Accordingly, this prior art active suspension control system establishes improved cornering characteristics when lateral acceleration acts on the vehicle body. However, the above mentioned system does not serve to secure desired acceleration characteristics and driving stability when the vehicle travels on a road surface having different friction coefficients between left and right wheels.

Japanese Utility Model First Publication No. 62-191511 discloses an active suspension control system which is directed to increase a wheel load acting on a skidding driven wheel according to a wheel speed difference between left and right driven wheels only, irrespective of lateral acceleration acting on a vehicle body. Accordingly, this prior art suspension control system has disadvantages in that a variation in a wheel load caused by suspension control when a vehicle travels on a lower friction road surface is the same as that when traveling on a higher friction road surface even if lateral accelerations are different between the lower friction and the higher friction road surfaces. Thus, traction of the driven wheels is not secured effectively.

SUMMARY OF THE INVENTION

It is therefore a principal object of the present invention to avoid the disadvantages of the prior art.

It is another object of the invention to provide an automotive active suspension control system which serves to secure traction of driven wheels effectively, even when a vehicle travels on a road surface having different friction coefficients, for preventing acceleration characteristics and driving stability from being degraded due to slippage of one of a driven wheel pair.

According to one aspect of the present invention, there is provided an automotive suspension control system for anti-rolling motion control. This system serves to adjust wheel loads acting on driven wheels when a wheel speed difference between the driven wheels is greater than a preselected value, concluding that slippage occurs at one of the driven wheels, the adjustment is carried out for securing traction of the skidding driven wheel. Additionally, the system is responsive to lateral acceleration acting of a vehicle body to decrease a degree of adjustment of the wheel loads according to increase in the lateral acceleration for enhancing cornering stability on road surfaces having different friction coefficients.

According to another aspect of the present invention, there is provided an automotive suspension control system for anti-rolling motion control comprising: suspension units including actuators disposed between a vehicle body and suspension members which respectively support wheels rotatably, each actuator being adjustable with fluid pressure therein for active suspension control; a pressure source which supplies fluid pressure to the actuators of the suspension units; valve means for controlling the fluid pressure supplied from the pressure source to the actuators of the suspension units respectively; first sensor means for determining lateral acceleration acting on the vehicle body to provide a signal indicative thereof; second sensor means for determining wheel speeds of first and second driven wheels respectively to provide signals indicative thereof, the first driven wheel being arranged at a first lateral portion of the vehicle body, the second driven wheel being arranged at a second lateral portion opposite the first lateral portion; control means responsive to the signals from the second sensor means for providing control signals to the valve means to control the fluid pressure supplied to the actuators so that a wheel load acting on the greater one of the first and second driven wheels in wheel speed is increased by a preselected rate, the control means further responsive to the signal from the first sensor means for decreasing the preselected rate according to increase in the lateral acceleration acting on the vehicle body.

DESCRIPTION OF THE PREFERRED EMBODIMENT

Figure 1:
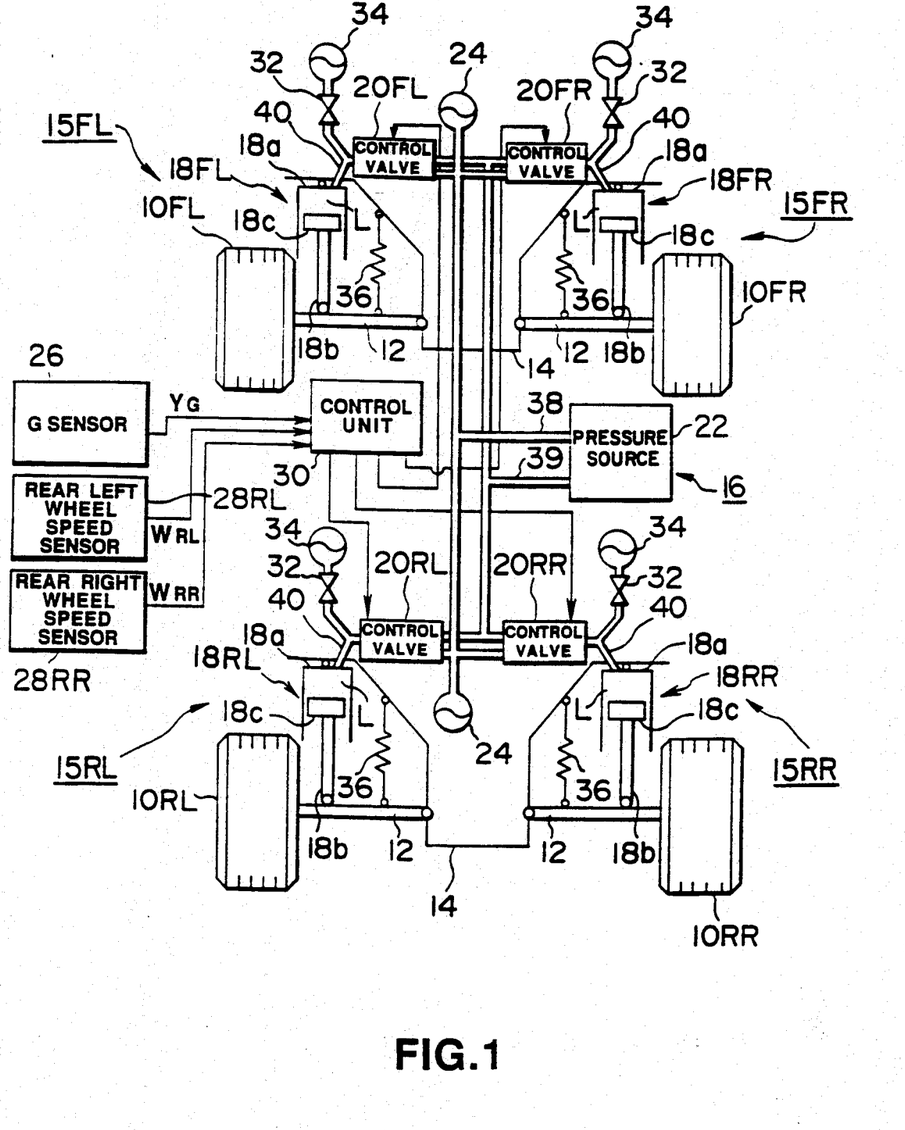
FIG. 1 is a schematic view which shows an active suspension system according to the present invention.

Referring now to the drawings, particularly to FIG. 1, an active suspension system 16 for a vehicle according to the present invention is shown. Hereinafter, the shown vehicle is referred as a rear-wheel drive vehicle wherein front left and right wheels 10FL and 10FR are compliance wheels and rear left and right wheels 10RL and 10RR are driven wheels.

The active suspension system 16 is operable to effect suspension control for regulating a vehicle height level and vehicle attitude change by suppressing relative displacement between a vehicle body 14 and suspension members 12 respectively, which support the front and rear wheels 10FL, 10FR, 10RL, and 10RR.

The suspension system 16 includes generally four suspension units 15FL, 15FR, 15RL, and 15RR for the corresponding wheels. The suspension units include working fluid cylinders 18FL to 18RR such as hydraulic cylinders functioning as actuators which are disposed between the suspension member 12 and the vehicle body 14. Coil springs 36 are arranged parallel to the working cylinders and, pressure control valves 20FL to 20RR are provided which serve to adjust working pressure supplied to the working cylinders 18FL to 18RR respectively. The coil springs 36 have a relatively low spring constant for bearing at least a portion of static load of the vehicle body 14. The working fluid cylinders 18FL to 18RR may utilize air as a working fluid. Additionally, instead of the pressure control valves, flow control valves may be utilized which adjust flow rates of the working fluid supplied to the working cylinders respectively.

The active suspension system 16 further includes a pressure source 22, two accumulators 24, a lateral acceleration sensor 26, rear-left and rear-right wheel speed sensors 28RL and 28RR, and a control unit 30. The accumulators 24 are arranged between the pressure source 22 and the front pressure control valves 20FL and 20FR and the rear pressure control valves 20RL and 20RR respectively for accumulating working pressure from the pressure source 22. The lateral acceleration sensor 26 monitors lateral acceleration acting on the vehicle body 14 to provide a signal indicative thereof to the control unit 30. The rear-left and rear-right wheel speed sensors 28RL and 28RR serve to detect rotational speeds of the rear-left and rear-right driven wheels 10RL and 10RR respectively to provide signals indicative thereof to the control unit 30. The control unit 30 is then responsive to the signals from the lateral acceleration sensor 26 and the wheel speed sensors 28RL and 28RR to modify working pressure output from the pressure control valves 20FL to 20RR to the hydraulic cylinders 18FL to 18RR independently for controlling rolling motion of the vehicle body 14.

The suspension units 15FL to 15RR further include throttles, or orifices 32 communicating with pressure chambers L, as will be described hereinafter in detail, of the working cylinders 18FL to 18RR and accumulators 34 for absorbing vibration having a relatively high frequency transmitted from the wheels respectively.

Each of the working cylinders 18FL to 18RR includes a cylinder tube 18a which defines an upper pressure chamber L closed by a piston 18c. An upper portion of the cylinder tube 18a is attached to the vehicle body 14, while a lower portion of a piston rod 18b is attached to the suspension member 12.

Each of the pressure control valves 20FL to 20RR is designed as a three-port proportional electromagnetic pressure reducing valve which includes supply, return, and output ports. For example, U.S. Pat. No. 4,967,360, issued on Oct. 30, 1990 and assigned to the applicant common to the present invention, discloses a valve of this type, disclosure of which is incorporated herein by reference. The pressure control valve includes a valve housing having a cylindrical valve bore in which a valve spool is slidably disposed and a proportional solenoid installed in the valve housing. The supply and return ports are communicated with hydraulic pressure supply and return ports of the pressure source 22 through lines 38 and 39 respectively for supply and return working pressure to and from the pressure control valve, while the output port is communicated with the pressure chamber L of the working cylinder through a line 40.

With these arrangements, adjustment of a command, or exciting, current i applied to the solenoid causes displacement of the valve spool to be controlled, thereby causing controlled pressure $P_C$, to be output from the output port of the pressure control valve 20FL (-20RR) to the pressure chamber L of the working cylinder 18FL (-18RR), to be controlled according to the magnitude of the exciting current i.

Figure 2:
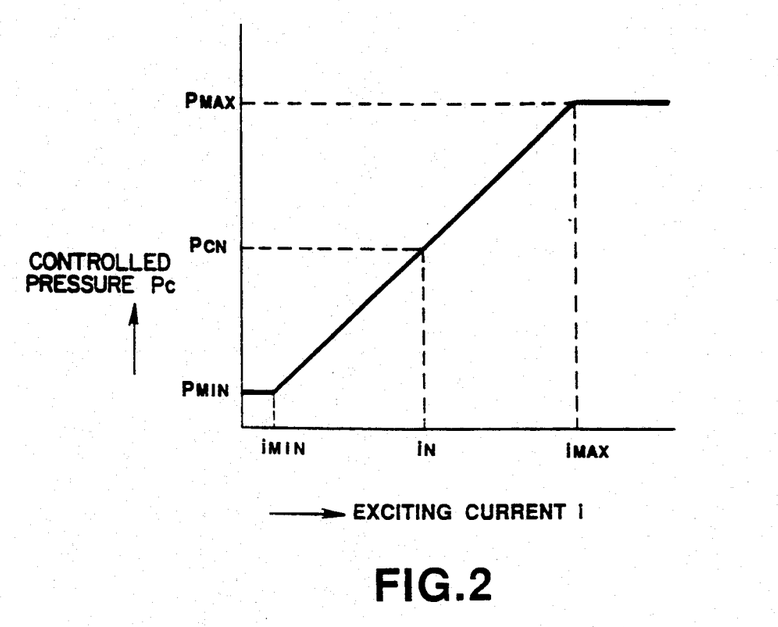
FIG. 2 is a graph which shows the relationship between output pressure of a pressure control valve and current applied thereto.

Referring to FIG. 2, the relationship between the exciting current i and controlled pressure $P_C$ is shown. When the exciting current i is $i_{MIN}$ adjacent zero, the pressure control valve provides a minimum controlled pressure $P_{MIN}$. As the exciting current is positively increased from this level, the controlled pressure $P_C$ becomes great proportionally with a preselected gain and is then saturated at a maximum set pressure $P_{MAX}$ of the pressure source 22 (i.e., a line pressure output from the pressure source). Additionally, when the exciting current $i_N$ is provided, the pressure control valve outputs neutral pressure $P_{CN}$ for maintaining the vehicle body at a standard height level.

Figure 3:
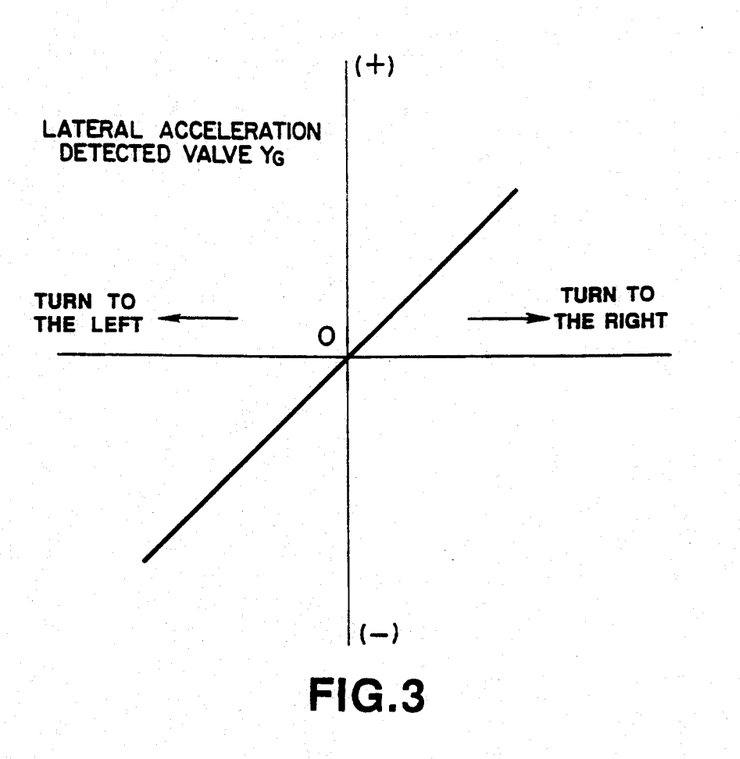
FIG. 3 is a graph which shows the relationship between lateral acceleration acting on a vehicle body and a value of detected lateral acceleration.

Referring to FIG. 3, the relationship between lateral acceleration acting on the vehicle body 14 and a value $Y_G$ of lateral acceleration detected by the lateral acceleration sensor 26 is shown. When a vehicle is turned to the right, the lateral acceleration sensor provides a signal indicative of a lateral acceleration detected value $Y_G$ having a positive voltage proportional to lateral acceleration acting on the vehicle body, while when the vehicle is turned to the left, a signal having a negative voltage is provided.

Figure 4:
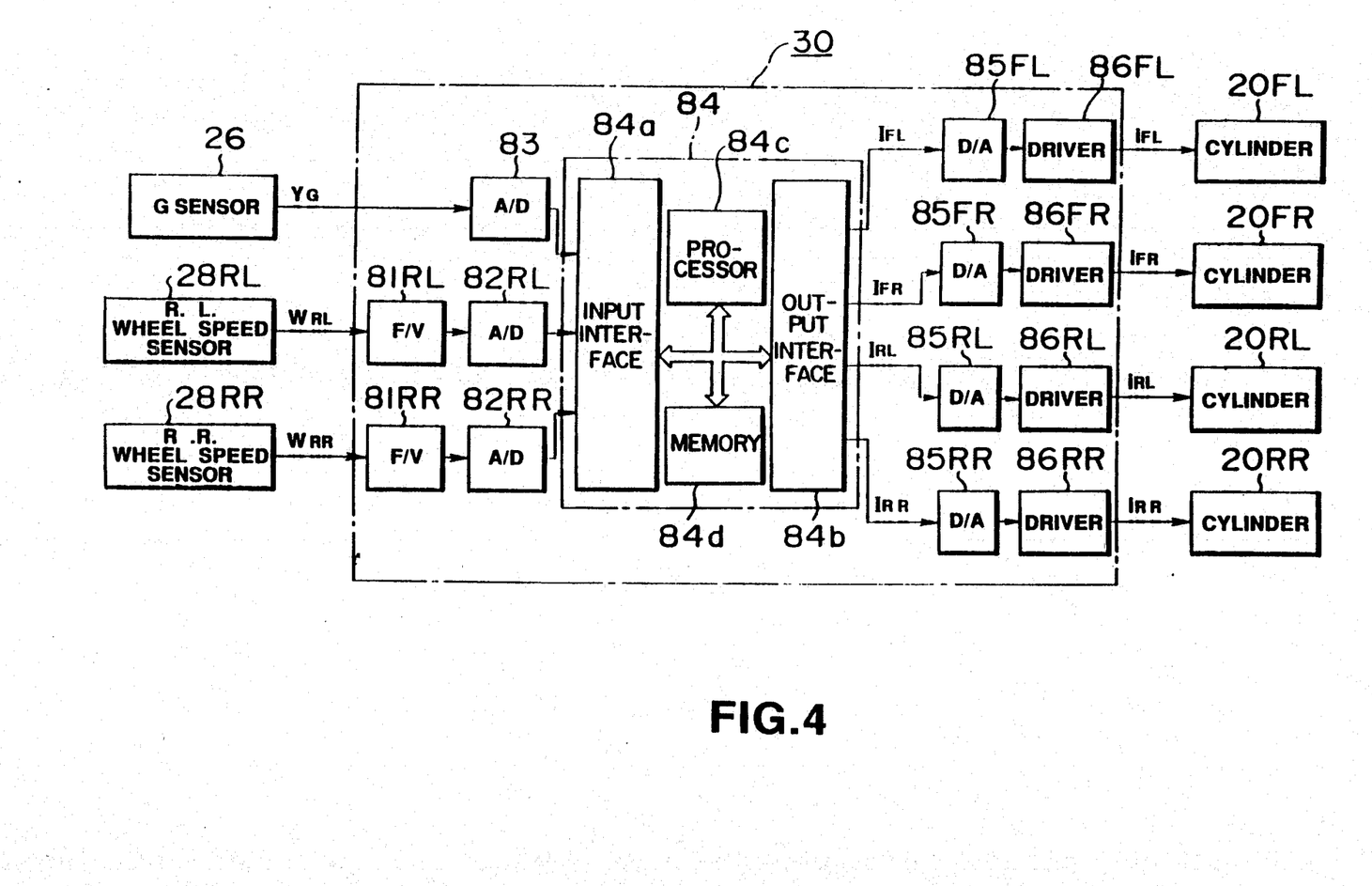
FIG. 4 is a block diagram which shows a control unit of an active suspension system of the invention.

Referring to FIG. 4, the control unit 30 includes generally frequency to voltage (F/V)converters 81RL and 81RR, and analog to digital (A/D) converters 83, 82RL, and 82RR, a microcomputer 84, digital to analog (D/A) converters 85FL to 85RR, and solenoid driving circuits 86FL to 86RR. The F/V converters 81RL and 81RR are responsive to pulse signals $W_{RL}$ and $W_{RR}$ output from the wheel speed sensors 28RL and 28RR corresponding to rear wheel speeds to convert these into voltages respectively. The A/D converters 82RL and 82RR then convert output signals from the converters 81RL and 81RR into digital signals to output them to the microcomputer 84. The A/D converter 83 is responsive to the signal $Y_G$ from the lateral acceleration sensor 26 to convert it into a digital signal and outputs the converted signal to the micro-computer 84. The microcomputer 84 provides digital signals indicating pressure command value $I_{FL}$ to $I_{RR}$ to the D/A converters 85FL to 85RR. The D/A converters then convert the digital signals into analog signals and output these to the solenoid driving circuits 86FL to 86RR. The driving circuits 86FL to 86RR then provide exciting currents $i_{FL}$ to $i_{RR}$ to the solenoids of the pressure control valves 20FL to 20RR.

The control unit 30 may be provided with an electronic circuit incorporating a function generator and an arithmetic circuit.

The microcomputer 84 includes generally an input interface circuit 84a, an output interface circuit 84b, an arithmetic processing unit 84c, and a memory 84d. The arithmetic processing unit 84c, as will be described hereinafter in detail, serves to carry out a preselected anti-rolling motion control program to adjust vehicle load distributed to driven wheels (i.e., a wheel load) when a wheel speed difference between the driven wheels is greater than a preselected value, concluding that slippage occurs at one of the driven wheels, for securing traction of the slipping driven wheel.

The microcomputer 84 may also effect anti-pitching motion control according to longitudinal acceleration acting on the vehicle body as well as anti-bouncing motion control based on vertical acceleration acting on the vehicle body based on another program different from the anti-rolling motion control program.

The memory 84d pre-stores a processing program (i.e., the anti-rolling motion control program) for the operation of the arithmetic processing unit 84c and memorizes processing results from the arithmetic processing unit sequentially. The memory 84d further pre-stores a gain map and a maximum correction value map utilized for the operation of the arithmetic processing unit 84c which provides a gain $K_W$ and a maximum correction value $\Delta I_{max}$ as will be described hereinafter in detail.

Figure 5:
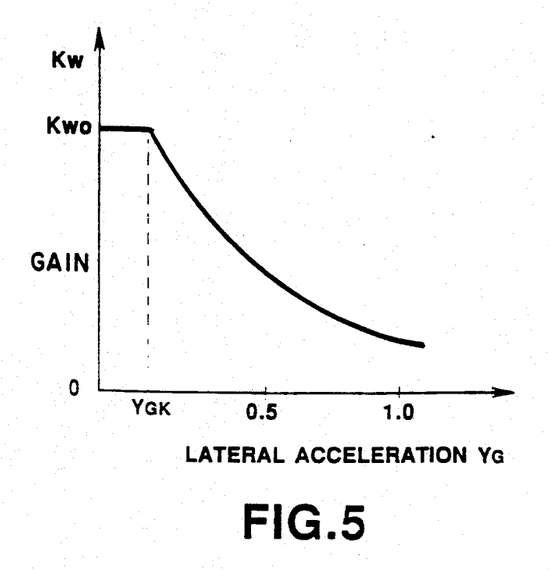
FIG. 5 is a graph which shows the relationship between lateral acceleration acting on a vehicle body and a gain used for modifying pressure command values for pressure control valves.
Figure 6:
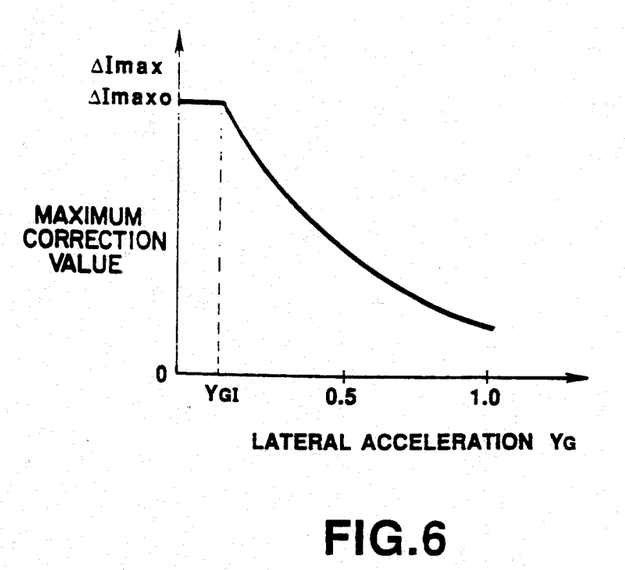
FIG. 6 is a graph which shows the relationship between lateral acceleration acting on a vehicle body and a maximum pressure command correction value.

Referring to FIGS. 5 and 6, there are shown the gain map and the maximum correction value map. These maps shows that the gain and the maximum correction value of relatively great values $K_{WO}$ and $\Delta I_{maxo}$ are provided respectively until the lateral acceleration value $Y_G$ reaches preselected lateral acceleration set values $Y_{GK}$ and $Y_{GI}$. When the lateral acceleration value $Y_G$ exceeds the values $Y_{GK}$ and $Y_{GI}$, the gain $K_W$ and the maximum correction value $\Delta I_{max}$ are decreased with preselected rates with the increased lateral acceleration value $Y_G$.

Figure 7:
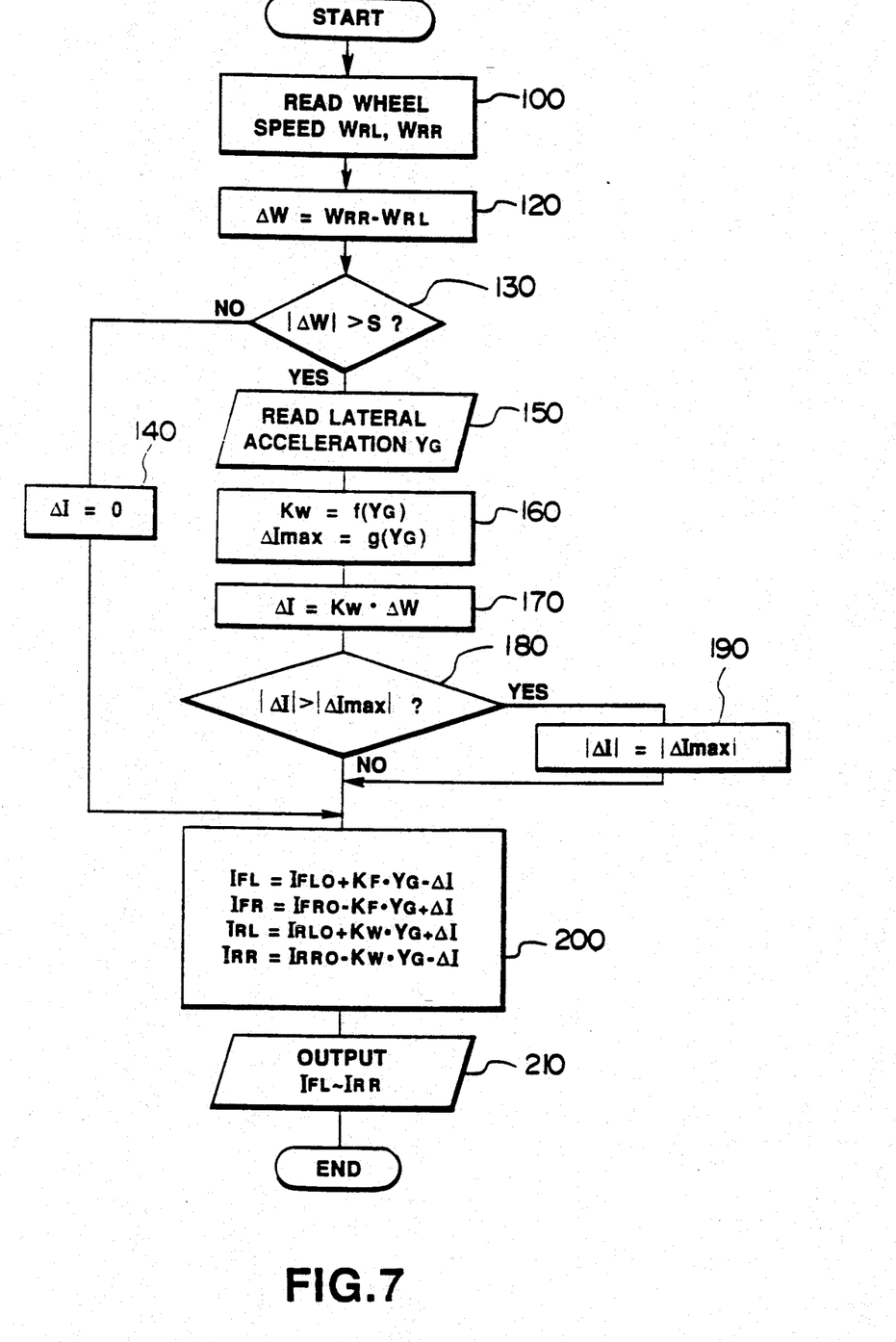
FIG. 7 is a flowchart which shows logical steps performed by a control unit of an active suspension control system.

Referring to FIG. 7, there is shown a flowchart of a program or sequence of logical steps performed by the arithmetic processing unit 84c. This program is carried out by timer interruption every preselected cycle, for example 20 (msec.).

After entering the program, the routine proceeds to step 100 wherein the wheel speeds $W_{RL}$ and $W_{RR}$ detected by the wheel speed sensors 28RL and 28RR are read. The routine then proceeds to step 120 wherein the wheel speed difference $\Delta W$ between the wheel speeds $W_{RL}$ and $W_{RR}$ of the left and right driven wheels is determined according to the following relation.

$$\Delta W = W_{RR} - W_{RL} \tag{1}$$

The routine then proceeds to step 130 wherein it is determined whether an absolute value $|\Delta W|$ of the wheel speed difference $\Delta W$ derived by the above equation is greater than a preselected threshold value S or not. If a NO answer is obtained ($\Delta W \leq S$), concluding that the wheel speeds $W_{RL}$ and $W_{RR}$ are substantially equal to each other, the routine then proceeds to step 140 wherein the pressure command correction value $\Delta I$ is set to zero, afterward, the routine proceeds to step 200 as will be described hereinafter. Alternatively, if a YES answer is obtained ($\Delta W > S$) in step 130, the routine proceeds to step 150 wherein the lateral acceleration value $Y_G$ from the lateral acceleration sensor 26 is read. The routine then proceeds to step 160 wherein the gain $K_W$ and the maximum correction value $\Delta I_{max}$ are determined based on the lateral acceleration value $Y_G$ referring to the gain map and the maximum correction value map as shown in FIGS. 5 and 6.

After step 160, the routine proceeds to step 170 wherein the gain $K_W$ is multiplied by the wheel speed difference $\Delta W$ to determine the pressure command correction value $\Delta I$ ($= K_W \times \Delta W$).

The routine proceeds to step 180 wherein it is determined whether an absolute value $|\Delta I|$ of the pressure command correction value $\Delta I$ is greater than the maximum correction value $\Delta I_{max}$ derived in step 160. If a NO answer is obtained ($|\Delta I| \leq \Delta I_{max}$), the routine directly proceeds to step 200. If a YES answer is obtained ($|\Delta I| > \Delta I_{max}$), the routine then proceeds to step 190 wherein $|\Delta I|$ is set to $|\Delta I_{max}|$ (i.e., $\pm \Delta I = \pm \Delta I_{max}$), after which the routine proceeds to step 200.

In step 200, the pressure command values $I_{FL}$ to $I_{RR}$ for the pressure control valves 20FL to 20RR are derived according to mathematical relations below.

$$I_{FL} = I_{FLO} + K_F \cdot Y_G - \Delta I \tag{2}$$

$$I_{FR} = I_{FRO} - K_F \cdot Y_G + \Delta I \tag{3}$$

$$I_{RL} = I_{RLO} + K_W \cdot Y_G + \Delta I \tag{4}$$

$$I_{RR} = I_{RRO} - K_W \cdot Y_G - \Delta I \tag{5}$$

where $I_{FLO}$, $I_{FRO}$, $I_{RLO}$, and $I_{RRO}$ are neutral pressure command values for maintaining the vehicle body on a level orientation at a standard height, and $K_F$ is a gain for the pressure command value $I_{FL}$ ($I_{FR}$) provided to the front pressure control valve 20FL (20FR) for adjusting a diagonal rolling moment caused by the anti-rolling motion control of the rear wheels. A value of the gain $K_F$ is the same as that of the gain $K_W$, but may be set to a preselected value different from the gain $K_W$.

Subsequently, the routine proceeds to step 210 wherein control signals representing the pressure command values $I_{FL}$ to $I_{RR}$ are output to the pressure control valves 20FL to 20RR for performing wheel load control under active suspension control, after which the routine terminates.

In operation, assuming that a vehicle is traveling straight on a dry, even road without any protrusions, for example, a concrete road having a high friction coefficient, the wheel speeds $W_{RL}$ and $W_{RR}$ of the rear driven wheels 10Rl and 10RR are considered to agree with each other, determining in step 130 that the wheel speed difference derived in step 120 is about zero. The routine therefore proceeds to step 140 wherein the pressure command correction value $\Delta I$ is set to zero, after which the routine proceeds to step 200. Additionally, since no lateral acceleration acts on the vehicle body because the vehicle travels straight, the lateral acceleration sensor 26 provides the signal indicating the lateral acceleration value $Y_G$ of zero and the pressure command values $I_{FL}$ to $I_{RR}$ provided in step 200 are set to the neutral pressure command values $I_{FLO}$ to $I_{RRO}$. The driving circuits 86FL to 86RR are then responsive to the pressure command values $I_{FL}$ to $I_{RR}$ including only the neutral pressure command values $I_{FL}$ to $I_{RR}$ to output the exciting currents $i_{FL}$ to $i_{RR}$ to the pressure control valves 20FL to 20RR respectively, thereby producing preselected degrees of thrust in the hydraulic cylinders 18FL to 18RR to level the vehicle body at a standard height.

When the vehicle is turned to the right (or the left) gradually with slow steering operation from a straight traveling status, the vehicle body tends to roll and the lateral acceleration sensor 26 detects lateral acceleration acting on the vehicle body to provide a signal indicative of a lateral acceleration value $Y_G$, having a positive voltage (or a negative voltage) according to a degree of the detected lateral acceleration, to the control unit 30. Due to this gradual turning on a high friction road surface, the lateral acceleration value $Y_G$ is considered to be relatively small with no slippage of the rear driven wheels 10RL and 10RR. The wheel speed difference $\Delta W$ is therefore maintained at zero in step 120. However, with the lateral acceleration value $Y_G$ varying in a positive direction (or a negative direction), the pressure command values $I_{FL}$ and $I_{RL}$ for the pressure control valves 20FL and 20RL associated with the left working cylinders 18FL and 18RL arranged on an outside portion of the vehicle body lowering during turns (or the pressure command values $I_{FR}$ and $I_{RR}$ for the pressure control valves 20FR and 20RR associated with the the right working cylinders 18FR and 18RR) are increased from the neutral pressure command values $I_{FLO}$ and $I_{RLO}$ (or $I_{FRO}$ and $I_{RRO}$) in the straight traveling status by a value of $K_F \cdot Y_G$ and $K_W \cdot Y_G$, while the pressure command values $I_{FR}$ and $I_{RR}$ for the pressure control valves 20FR and 20RR associated with the right working cylinders 18FR and 18RR arranged on an inside portion of the vehicle body rising during turns (or the pressure command values $I_{FL}$ and $I_{RL}$ for the pressure control valves 20FL and 20RL associated with the the right working cylinders 18FL and 18RL) are decreased from the neutral pressure command values $I_{FRO}$ and $I_{RRO}$ (or $I_{FLO}$ and $I_{RLO}$) in the straight traveling status by the value of $K_F \cdot Y_G$ and $K_W \cdot Y_G$.

With the pressure command values $I_{FL}$ to $I_{RR}$ varying in the above manner, the working cylinders, 18FL and 18RL, for example, on the outside during turning (or alternatively 18FR and 18RR may be on the outside during turns in the opposite direction) produce thrust increasing at the same rate, while the working cylinders 18FR and 18RR, inside during turning, (or alternatively 18FL and 18RL) provide thrust decreasing at the same rate. This produces an anti-rolling moment to level the vehicle body at the regulated height.

Figure 8:
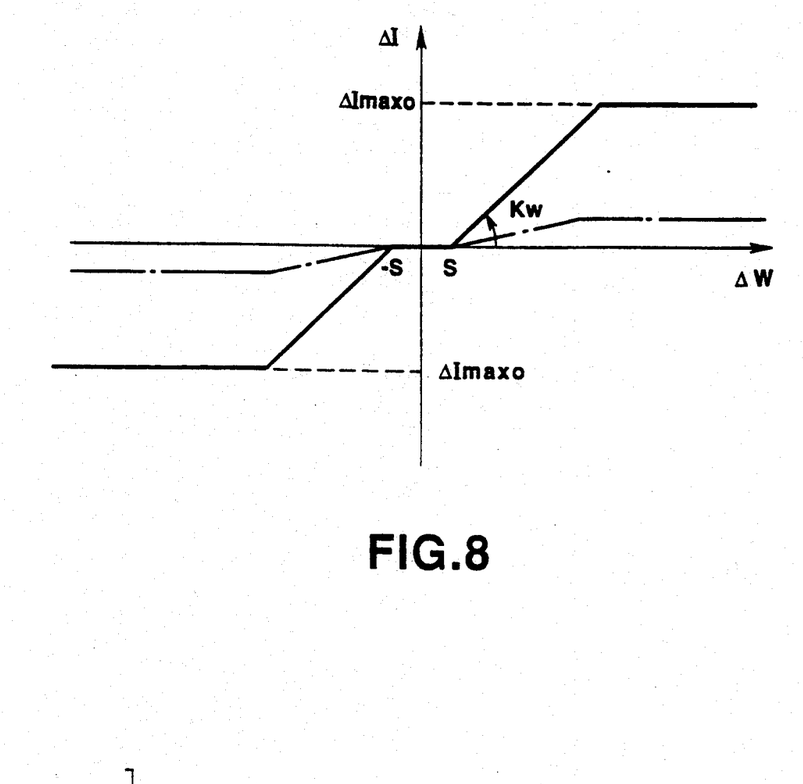
FIG. 8 is a graph which shows the relationship between a wheel speed difference between left and right driven wheels and a pressure command correction value for modifying a pressure command value for a pressure control valve.

When the vehicle is turned to the right (or the left) quickly from a straight traveling status, relatively great lateral acceleration acts on the vehicle body and the lateral acceleration sensor 26 provides a signal indicative of a lateral acceleration value $Y_G$, having a relatively great positive voltage (or a negative voltage). As already mentioned in FIG. 5, as the lateral acceleration value $Y_G$ is increased, the gain $K_W$ is decreased. Thus, when the great magnitude of lateral acceleration acts on the vehicle body, the vehicle body is allowed to roll slightly, thereby an inside portion of the vehicle body rises somewhat during turning. This causes the inside driven wheel 10RR (or 10RL) to skid, resulting in the wheel speed difference $\Delta W$ derived in step 120 varying positively (or negatively) over the threshold value S. The routine then proceeds to step 150 wherein the lateral acceleration value $Y_G$ is considered to be great and thus the gain $K_W$ and the maximum correction value $\Delta I_{max}$ of small values are provided in step 160 (see FIGS. 5 and 6). Accordingly, a relation between the wheel speed difference $\Delta W$ and the pressure command correction value $\Delta I$ is given by a dashed line in FIG. 8. This relation shows that when lateral acceleration acting on the vehicle body is great, with the increased wheel speed difference $\Delta W$, the pressure command correction value $\Delta I$ is increased at a smaller gain $K_W$ and then saturated at a maximum correction value $\Delta I_{max}$ modified to a value smaller than the upper limit value $\Delta I_{max0}$ of the maximum correction value. It will be appreciated that the variation in the thrusts produced by the working cylinders 18FL to 18RR to become smaller with the increased lateral acceleration, thereby decreasing the variation in load shifts between the right and left wheels caused by the anti-rolling control. This allows the vehicle body to roll to a certain extent according to the magnitude of lateral acceleration to secure cornering forces for establishing weak understeering characteristics while turning quickly on a high friction road surface for enhancing cornering stability.

On the other hand, when the vehicle is traveling straight on a road surface having a low friction coefficient such as rainy, snowy, or icy roads, the lateral acceleration value $Y_G$ output from the lateral acceleration sensor 26 is considered to be approximately zero. However, slippage tends to occur at the driven rear wheels 10RL and 10RR simultaneously, determining in step 120 that the wheel speed difference $\Delta W$ between the driven wheels is about zero. Thus, the pressure command correction value $\Delta I$ of about zero is provided in step 140, establishing neutral steering characteristics.

When the vehicle is turned to the right with acceleration while traveling straight on a low friction road surface, the lateral acceleration sensor 26 provides a lateral acceleration value $Y_G$ varying in a positive direction (or a negative direction).

Generally, in such condition, inside wheels will skid during turning. However, with the lateral acceleration acting on the vehicle body increasing during turning on a low friction road surface, the wheels slide sideways, causing the lateral acceleration value $Y_G$ to become smaller than that during traveling on a high friction road surface (i.e., less than 0.2~0.3 G). The gain $K_W$ and the maximum correction value $\Delta I_{max}$ derived in step 160 are respectively considered to be substantially equal to those during turning gradually on a high friction road surface. Accordingly, the pressure command correction value ΔI derived in step 170 is set to a relatively greater value. If an inside wheel skids during turning, or the wheel speed $W_{RR}$ of the driven wheel 10RR during turning to the right (or the wheel speed $W_{RL}$ of the driven wheel 10RL during turning to the left) is greater than the wheel speed $W_{RL}$ of the wheel 10RL (or the wheel speed $W_{RR}$ of the wheel $10_{RR}$), the control unit 30 carries out anti-rolling control in step 210 wherein the pressure command values $I_{FL}$ to $I_{RR}$ are corrected by the pressure command correction value ΔI so that the wheel load acting on the inside driven wheel 10RR (or 10RL) of greater wheel speed is increased, while the outside driven wheel 10RL (or 10RR) of smaller wheel speed is decreased, restricting slippage at the inside wheel for modifying steering characteristics in an understeering direction to secure driving stability during turning with acceleration.

Additionally, when the vehicle is traveling on a split friction road wherein the right and left wheels run on different road surfaces having different friction coefficients respectively, the driven wheel 10RR (or 10RL) on the lower friction road surface will tend to skid. The wheel speed difference ΔW derived in step 120 is then increased. The gain $K_W$ and the maximum correction value are also set to the greater values $K_{WO}$ and $\Delta I_{maxo}$ respectively since the lateral acceleration value $Y_G$ is zero during straight traveling. Thus, the pressure command correction value ΔI derived in step 180 is set to a greater value, increasing a wheel load acting on the skidding driven wheel in the same manner as the cornering control as described above for enhancing acceleration characteristics and driving stability.

Figure 9A:
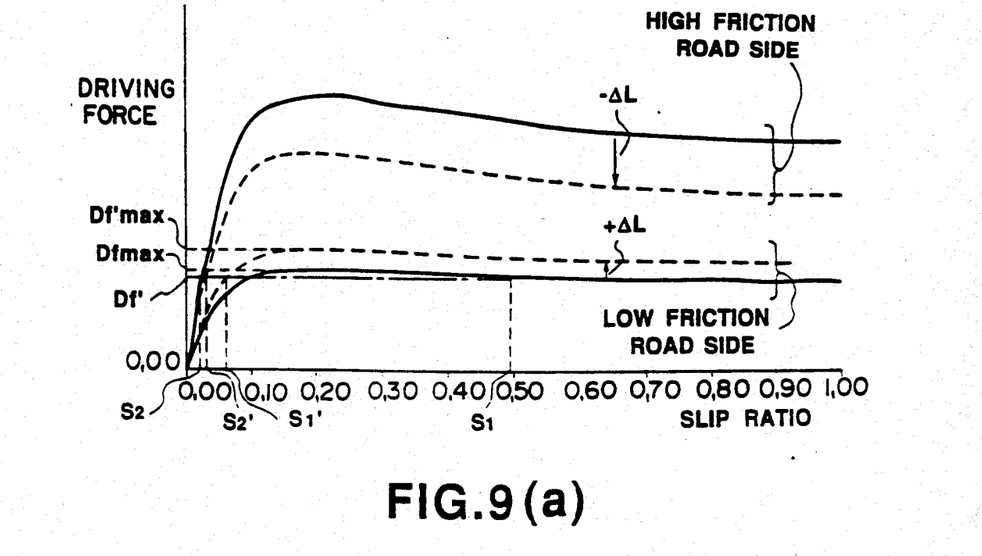
FIG. 9(a) is a graph which shows the relationship between driving force and a slip ratio of a driven wheel.

It will be appreciated that when a load shift between the right and left driven wheels is controlled during vehicle acceleration on a road with different friction surfaces, a maximum driving force depends upon a driving force of the driven wheel on the lower friction road surface in a case of a conventional differential gear transmitting the same driving force to the right and left driven wheels. Consequently, as shown in FIG. 9(a), by increasing a wheel load acting on a driven wheel on a lower friction road surface by ΔI, the maximum driving force is increased from $Df_{max}$ to $Df'_{max}$, improving acceleration characteristics. Moreover, driving stability is also improved similarly to a vehicle having a differential limiting device. Additionally, input of torque to a driven wheel which is greater than the maximum driving force $Df_{max}$ of the driven wheel on the lower friction road surface causes a slip ratio of the driven wheel to increase quickly (i.e., to a value $S_1$, a slip ratio $S=(V-v)/v$, V is vehicle speed, v is peripheral speed of a wheel). As a result of the increase in the slip ratio, side force of is undesirably decreased to $Sf_1$. However, increasing a wheel load acting on the driven wheel on the lower friction road surface by ΔI with a decreased wheel load acting on the other driven wheel on a higher friction road surface causes the increase in the slip ratio of the driven wheel on the lower friction road surface to be restricted to a value $S_1'$ which enables the driven wheel to generate the driving force Df'. Moreover, a side force of $Sf'_1$ is secured.

Figure 9B:
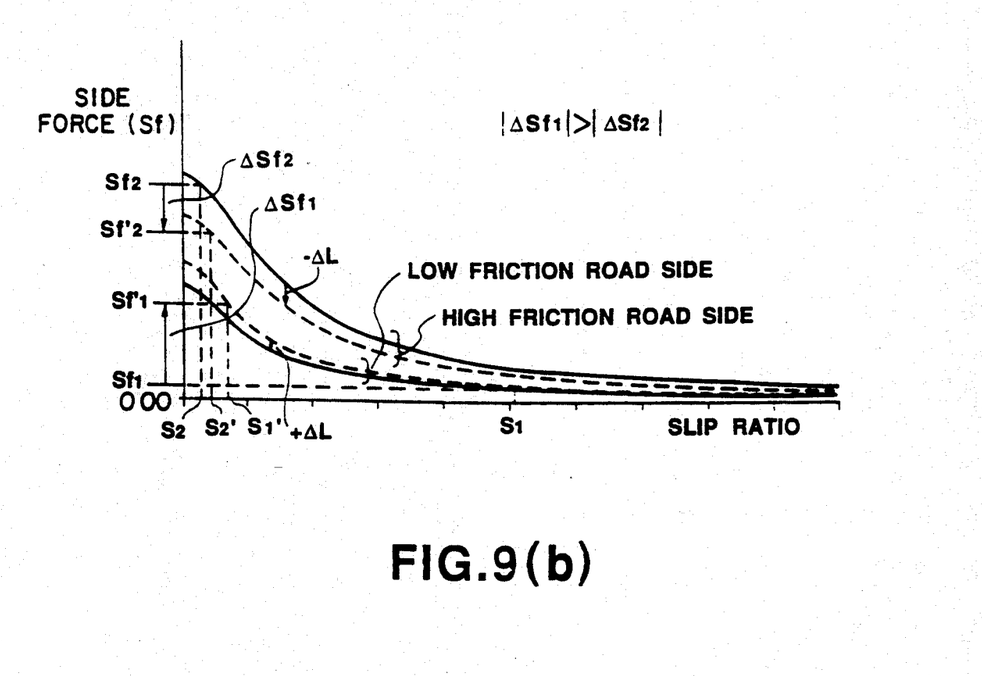
FIG. 9(b) is a graph which shows the relationship between side force and a slip ratio of a driven wheel.

Under the above circumstances a wheel load of the driven wheel on the higher friction road surface is decreased, with a slip ratio thereof decreasing from $S_2$ to $S_2'$ as well as side force thereof decreasing from $Sf_2$ to $Sf'_2$. However, a variation in the side force $\Delta Sf_1$ $(=Sf'_1-Sf_1)$ of the driven wheel on the lower friction road surface is greater than the side force $\Delta Sf_2$ $(=Sf'_2-Sf_2)$ of the driven wheel on the higher friction road surface and thus a total of the side forces becomes greater, improving driving stability. It will be noted that when the vehicle travels on a road having different friction coefficients, side force of an inside wheel during turning is secured, ensuring optimal acceleration characteristics.

Figure 10:
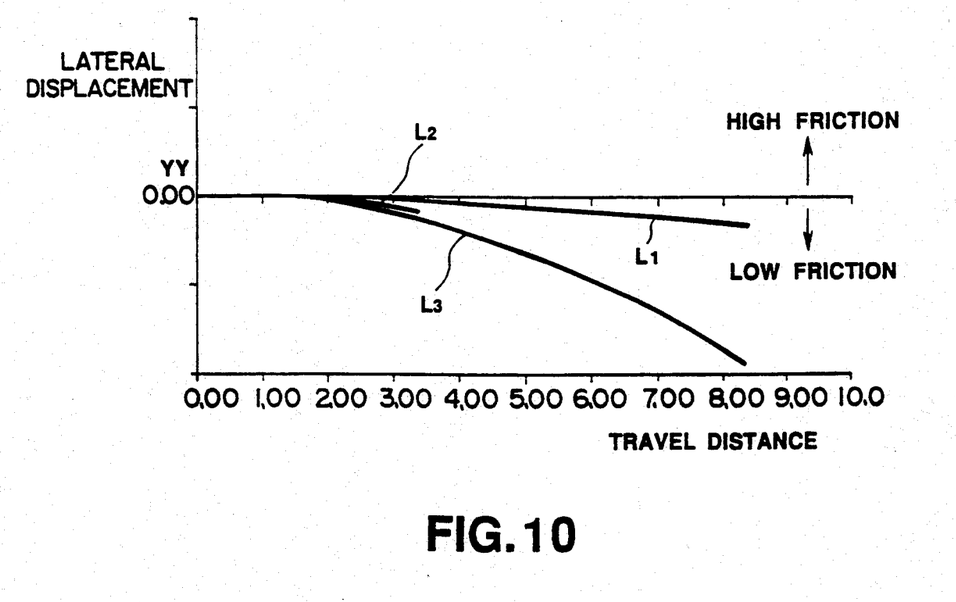
FIG. 10 is a graph which shows the relationships between lateral displacements and travel distances in conventional suspension systems and the suspension system of the present invention.

Referring to FIG. 10, there is shown relations between a lateral displacement and a traveling distance of the center of gravity of a vehicle by acceleration with a fully opened throttle valve for three minutes on a road having different friction coefficients in a case of vehicles meeting three specifications: vehicles including only a conventional differential gear; vehicles including a conventional differential gear with the control of the present invention; or vehilces including a viscous differential gear. A line $L_1$ in FIG. 10 shows that the vehicle with the system of the present invention exhibits improved acceleration characteristics and driving stability. A line $L_2$ shows the vehicle with the conventional differential gear only and that a slip ratio of the driven wheel on the lower friction road surface is increased, causing the side force to be reduced, resulting in lowered driving stability, driving force, and acceleration characteristics, due to slippage of one driven wheel only. Additionally, a line $L_3$ shows the vehicle with the viscous differential gear and that torque is transmitted to the driven wheel on the higher friction road surface as well as the driven wheel on the lower friction road surface, however, driving forces of right and left driven wheels are unbalanced, degrading driving stability.

Figure 11:
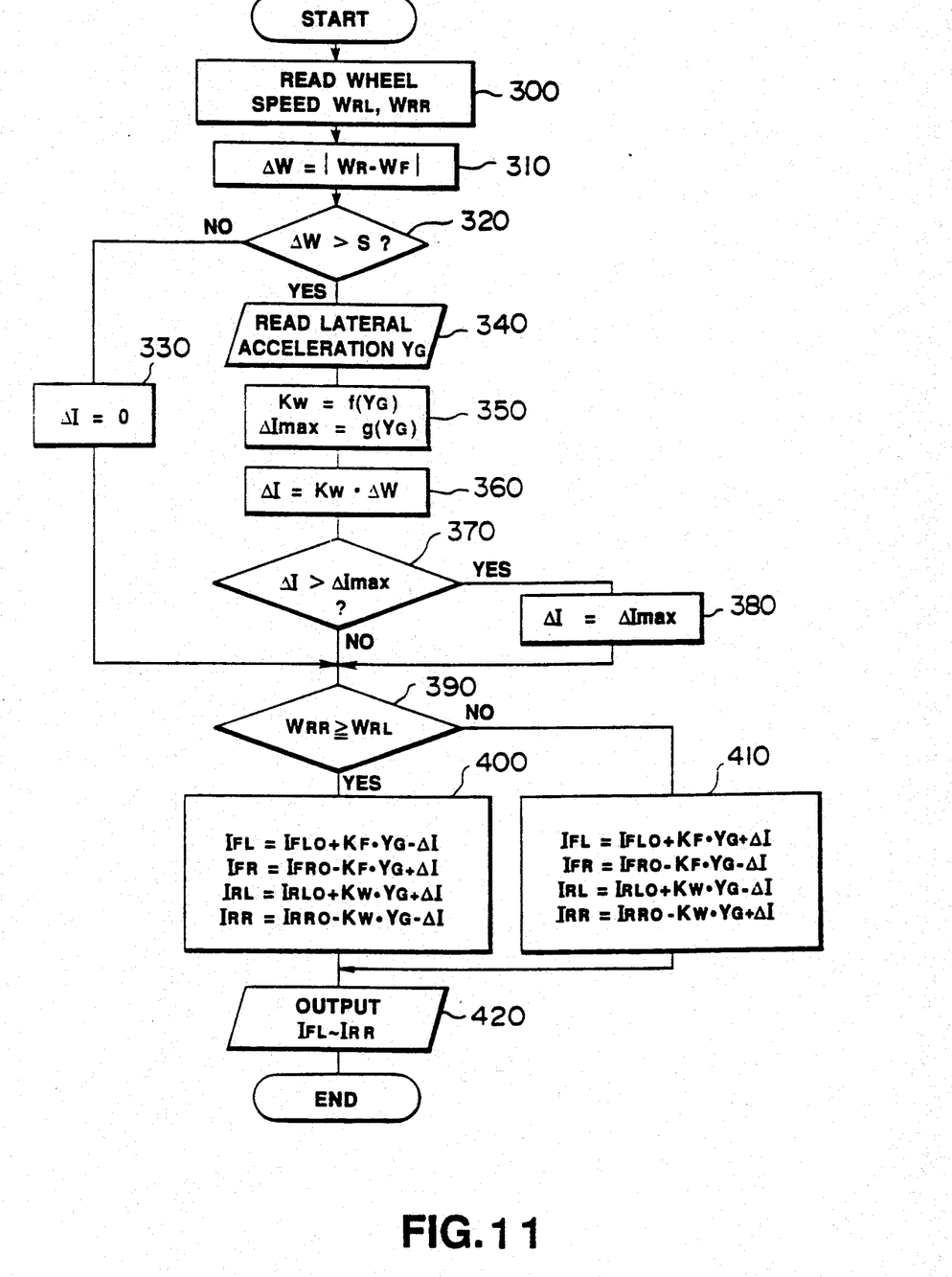
FIG. 11 is a flowchart which shows logical steps performed by a control unit of a second embodiment.

Referring to FIG. 11, there is shown a flowchart of an alternate program or sequence of logical steps performed by the arithmetic processing unit 84c. This program is different from the above mentioned program of the first embodiment only in that an absolute value of a wheel speed difference ΔW between right and left wheels is calculated and determination is made in another step as to which of wheel speeds of the left and right wheels is the greater.

After entering the program, the routine proceeds to step 300 wherein the wheel speeds $W_{RL}$ and $W_{RR}$ of the rear left and right wheels 10RL and 10RR are read. The routine then proceeds to step 310 wherein the wheel speed difference ΔW between the wheel speeds $W_{RL}$ and $W_{RR}$ is determined according to the mathematical relation below.

$$\Delta W = |W_{RL} - W_{RR}| \qquad (6)$$

The routine proceeds to step 320 wherein it is determined as to whether the wheel speed difference ΔW derived by the above equation is greater than a preselected threshold value S or not. If a NO answer is obtained (ΔW≦S), concluding that the wheel speeds $W_{RL}$ and $W_{RR}$ are substantially equal to each other, the routine then proceeds to step 330 wherein the pressure command correction value ΔI is set to zero, afterward, the routine proceeds to step 390 as will be described hereinafter. Alternatively, if a YES answer is obtained (ΔW>S) in step 320, the routine proceeds to step 340 wherein the lateral acceleration value $Y_G$ from the lateral acceleration sensor 26 is read. The routine then proceeds to step 350 wherein a gain $K_W$ and a maximum correction value $\Delta I_{max}$ are determined based on the lateral acceleration value $Y_G$ referring to the gain map and the maximum correction value map as already shown in FIGS. 5 and 6.

After step 350, the routine proceeds to step 360 wherein the gain $K_W$ is multiplied by the wheel speed difference $\Delta W$ to determine the pressure command correction value $\Delta I (=K_W \times \Delta W)$.

The routine then proceeds to step 370 wherein it is determined whether the pressure correction value $\Delta I$ is greater than the maximum correction value $\Delta I_{max}$ derived in step 350. If a NO answer is obtained ($\Delta I \leq \Delta I_{max}$), the routine directly proceeds to step 390. If a YES answer is obtained ($\Delta I > \Delta I_{max}$), the routine then proceeds to step 380 wherein $\Delta I$ is set to $\Delta I_{max}$, after which the routine proceeds to step 390.

In step 390, it is determined as to whether the wheel speed $W_{RR}$ of the right driven wheel 10RR is greater than or equal to the wheel speed $W_{RL}$ of the left driven wheel 10RL. If a YES answer is obtained ($W_{RR} \geq W_{RL}$), the routine then proceeds to step 400 wherein pressure command values $I_{FL}$ to $I_{RR}$ for the pressure control valves 20FL to 20RR are derived according to the above described equations (2) to (5). Alternatively, if a NO answer is obtained in step 390 ($W_{RR} < W_{RL}$), the routine then proceeds to step 410 wherein the pressure command values $I_{FL}$ to $I_{RR}$ are determined according to the following mathematical relations.

$$I_{FL} = I_{FLO} + K_F Y_G + \Delta I \qquad (7)$$

$$I_{FR} = I_{FRO} - K_F Y_G - \Delta I \qquad (8)$$

$$I_{RL} = I_{RLO} + K_W Y_G - \Delta I \qquad (9)$$

$$I_{RR} = I_{RRO} - K_W Y_G + \Delta I \qquad (10)$$

After steps 400 and 410, the routine proceeds to step 420 wherein control signals representing the pressure command values $I_{FL}$ to $I_{RR}$ are output to the pressure control valves 20FL to 20RR through the D/A converters 85FL to 85RR and the driving circuits 86FL to 86RR for performing wheel load control under active suspension control, after which the routine terminates.

With the above mentioned control, after determining the absolute value of the wheel speed difference $\Delta W$ between the wheel speeds $W_{RL}$ and $W_{RR}$ of the rear left and right wheels 10RL and 10RR, determination is made as to which of the wheel speeds $W_{RL}$ and $W_{RR}$ is the greater. If the wheel speed $W_{RR}$ of the rear right wheel is greater, a wheel load acting on the rear right wheel is increased. On the other hand, if the wheel speed $W_{RL}$ of the rear left wheel is greater, a wheel load acting on the rear left wheel is increased. Therefore, the above second embodiment also secures the same system operation and effect as the first embodiment.

While the present invention has been disclosed in terms of the preferred embodiment in order to facilitate better understanding thereof, it should be appreciated that the invention can be embodied in various ways without departing from the principle of the invention. For example, the present invention may be applied to a front-wheel drive vehicle as well as a rear-wheel drive vehicle. In the case of the front-wheel drive vehicle, increasing a wheel load acting on a driven wheel inside during turning causes steering characteristics to be directed to an oversteering direction, thereby compensating variation in steering characteristics in an understeering direction caused by slippage of a front wheel to establish neutral steering characteristics for improving swing motion and acceleration characteristics of the front-wheel drive vehicle.

Additionally, the above system of the present invention provides the pressure correction value $\Delta I$ based on the gain $K_W$ and the maximum correction value $\Delta I_{max}$ which are decreased according to increase in the lateral acceleration value $Y_G$, however, either of the gain $K_W$ or the maximum correction value $\Delta I$ may be decreased with the increased lateral acceleration value $Y_G$.

Further, the system of the invention may be applied to any type of a vehicle including, for example, a differential gear with a differential limiting device or a differential gear with no differential limiting device as well as a conventional differential gear.

What is claimed is:

1. An automotive suspension control system for anti-rolling motion control comprising:

suspension units including actuators disposed between a vehicle body and suspension members which respectively support wheels rotatably, each actuator being adjustable with fluid pressure therein for active suspension control;

a pressure source which supplies fluid pressure to the actuators of said suspension units;

valve means for controlling the fluid pressure supplied from said pressure source to the actuators of said suspension units respectively;

first sensor means for determining lateral acceleration acting on the vehicle body to provide a signal indicative thereof;

second sensor means for determining wheel speeds of first and second driven wheels respectively to provide signals indicative thereof, the first driven wheel being arranged at a first lateral portion of the vehicle body, the second driven wheel being arranged at a second lateral portion opposite the first lateral portion; and control means responsive to the signals from said second sensor means for providing control signals to said valve means to control the fluid pressure supplied to the actuators so that a wheel load acting on a greater one of the first and second driven wheels in wheel speed is increased by a preselected rate, said control means further responsive to the signal from said first sensor means for decreasing said preselected rate according to increase in the lateral acceleration acting on the vehicle body.

2. A system as set forth in claim 1, wherein said control means determines a wheel speed difference between the first and second driven wheels based on the signals from said second sensor means, said control means determining said preselected rate in a given relation to the wheel speed difference within a preselected range and decreasing an upper limit value of the preselected range according to an increase in the lateral acceleration acting on the vehicle body.

3. A system as set forth in claim 1, wherein said control means decreases said preselected rate by a second preselected rate which is determined in a given relation to the magnitude of the lateral acceleration acting on the vehicle body.

4. A system as set forth in claim 1, wherein said control means determines a wheel speed difference between the first and second drive wheels based on the signals from said second sensor means, a wheel load acting on the first or second driven wheel with the greater wheel speed is increased by the preselected rate when the wheel speed difference is greater than a preselected threshold value.

5. A system as set forth in claim 1, wherein control means modifies the control signals to said valve means by a preselected gain respectively based on the lateral acceleration acting on the vehicle body, the preselected gain being decreased according to the increase in the lateral acceleration.

6. A system as set forth in claim 5, wherein the control signal includes first and second control signals, the first control signal being to increase the fluid pressures supplied to the actuators associated with outside wheels by the preselected gain when a vehicle turns, the second control signal being to decrease the fluid pressures supplied to the actuators associated with inside wheels by the preselected gain when the vehicle turns.

7. A system as set forth in claim 5, wherein said control means determines a wheel speed difference between the first and second driven wheels based on the signals from said second sensor means, said control means determining said preselected rate for increasing the wheel load acting on the first or second driven wheel with the greater wheel speed, based on the preselected gain and the wheel speed difference.

8. A system as set forth in claim 1, wherein said control means provides control signals including first, second, third, and fourth pressure command signals, the first and second pressure command signals being to increase the fluid pressures supplied to the actuators by a preselected gain which are associated with the first driven wheel and a first compliance wheel respectively, arranged at the first lateral portion of the vehicle body, outside during turning, the third and fourth pressure command signals being to decrease the fluid pressures supplied to the actuators by the preselected gain which are associated with the second driven wheel and a second compliance wheel respectively, arranged at the second lateral portion of the vehicle body, inside during turning, said control means being responsive to the signals from said second sensor means for correcting the first and third pressure command signals to increase the wheel load acting on the first or second driven wheel with the greater wheel speed and decrease a wheel load acting on the other driven wheels by the preselected rate, and correcting the second and fourth pressure command signals to increase a wheel load acting on one of the first and second compliance wheels which is arranged diagonally with respect to the driven wheel with the greater wheel speed and decrease a wheel load acting on the other compliance wheel.

* * * * *